United States Patent [19]

Yamamoto et al.

[11] Patent Number: 4,759,988
[45] Date of Patent: Jul. 26, 1988

[54] GRAIN FOR CONSTRUCTION MATERIAL

[75] Inventors: Tadashi Yamamoto, Sendai; Yoshihiko Ohama, 2-14-10-402, Hiyoshi, Kohoku-ku, Yokohama-shi; Seishi Suzuki, Sendai, all of Japan

[73] Assignees: Tohoku Electric Power Company, Inc., Sendai; Yoshihiko Ohama, Yokohama; Tohoku Pole Company, Inc., Sendai, all of Japan

[21] Appl. No.: 56,906

[22] Filed: Jun. 3, 1987

[51] Int. Cl.$^4$ ............................................. B32B 5/16
[52] U.S. Cl. ........................................ 428/402; 428/323
[58] Field of Search ............... 428/402, 403, 404, 902, 428/87, 367, 372, 703, 323

[56] References Cited

U.S. PATENT DOCUMENTS 4,065,599 12/1977 Nishiumi et al. ..................... 428/402
4,671,994 6/1987 Cochran, Jr. ......................... 428/402

FOREIGN PATENT DOCUMENTS 0014470 2/1981 Japan .................................. 428/703
3209488 9/1982 Netherlands ....................... 428/402

Primary Examiner—Marion C. McCamish
Attorney, Agent, or Firm—Oblon, Fisher, Spivak, McClelland & Maier

[57] ABSTRACT

Disclosed is an improved granular material used for forming construction materials such as concrete and mortar. The grain material comprises a main material of fly ash or slug powder and reinforcing fibers. The reinforcing fibers are mixed with the main material together with a binder to form a grain body such that the reinforcing fibers project outward from the surface of the grain body. The reinforcing fibers mixed in this fashion permit increasing the bonding strength between the grain and the binder such as cement so as to improve the mechanical strength of the resultant construction material.

4 Claims, 3 Drawing Sheets

GRAIN FOR CONSTRUCTION MATERIAL

BACKGROUND OF THE INVENTION

The present invention relates to a granular material for forming construction materials such as concrete and mortar, particularly, to a granular material prepared by mixing reinforcing fibers with the grain body such that the fibers project outward from the surface of the grain body. Because of the fiber projection, the bonding strength between the grain body and a binder such as cement is increased.

As known well, construction materials such as concrete and mortar are prepared by bonding grains such as stones, sand and artificial aggregate with a binder such as cement, lime, plaster or resin. It should be noted that the grains are bonded to each other by only the bonding strength of the binder, leading to an insufficiend reliability of the resultant construction material in mechanical strength.

Also, it is known to the art to mix reinforcing fibers with a binder. In this case, it is certainly possible to improve the mechanical strength of the binder itself. However, the reinforcing fibers mixed with the binder fail to improve the bonding strength between the aggregates, i.e., grains, and the binder. It follows that the resultant construction material such as concrete remains insufficient in its mechanical strength. What should also be noted is that skill of very high level is required for uniformly dispersing the reinforcing fibers within the binder.

SUMMARY OF THE INVENTION

An object of the present invention is to provide a grain for construction material having an improved bonding strength with a binder so as to provide a construction material having a sufficiently high mechanical strength.

According to one aspect of the present invention, there is provided a grain for construction material comprising a grain body and reinforcing fibers mixed with the grain body such that the fibers project outward from the surface of the grain body.

DETAILED DESCRIPTION OF THE PREFERRED EMBODIMENTS

Figure 1:
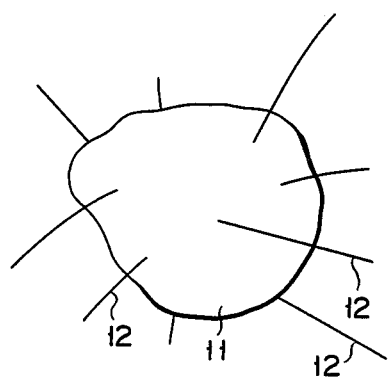
FIG. 1 schematically illustrates a grain for construction material according to one embodiment of the present invention.

FIG. 1 schematically illustrates a grain for construction material according to one embodiment of the present invention. As seen from the drawing, the grain comprises a grain body 11 and a plurality of reinforcing fibers 12 mixed with the grain body 11 such that the fibers 12 project outward from the surface of the body 11. The grain body 11 is prepared by mixing 90 to 50 parts by weight of a main material such as fly ash, slug powder or a mixture thereof, 50 to 10 parts by weight of a binder, e.g., cement, and a suitable amount of water. The grain body 11 is further mixed with 0.3 to 3% by volume of reinforcing fibers 12 and, as required, additives such as thickening agent, water reducing agent, foaming agent and nucleating agent. The resultant mixture is granulated by a pan-type or high speed mixing granulator, followed by subjecting the resultant grains to a wet, steam or autoclave curing so as to obtain the desired grains for construction material of non-baked type.

The grain for construction material of the present invention may be baked, as desired. In this case, the grain body 11 is prepared by mixing 90 to 50 parts by weight of a main material such as fly ash, slug powder or a mixture thereof, 50 to 10 parts by weight of a binder such as shale powder, clay or silica fume, and a suitable amount of water. The grain body 11 is further mixed with 0.3 to 3% by volume of reinforcing fibers 12 and, as required, additives such as water reducing agent, foaming agent, nucleating agent and sintering aid like feldspar. The resultant mixture is granulated by a pan-type or high speed mixing granulator, followed by drying and, then, sintering the resultant grains at, for example, 800° to 1,300° C. so as to obtain the desired grains for construction material of baked type.

The reinforcing fiber 12 used in the present invention includes fibers of, for example, nylon, aramid, carbon, glass, ceramics, metal and asbestos. The diameter of the reinforcing fiber 12 should be about 5 to 50 microns. On the other hand, the length of the fiber 12 should be at least equal to the diameter of the grain body 11 and should not be greater than 10 times the diameter of the grain body 11. In the case of preparing the baked-type grains for construction material, the reinforcing fiber 12 should be formed of a heat-resistant material such as carbon, glass and ceramics.

In the grain for construction material prepared as described above, the reinforcing fibers 12 project outward from the surface of the grain body 11 as shown in FIG. 1. Naturally, the reinforcing fibers 12 permit the grains for construction material of the present invention to be strongly bonded with the binder. It follows that the construction material such as concrete or mortar prepared by using the grains of the present invention is markedly advantageous over the conventional construction material in mechanical strength such as flexural strength, compressive strength, impact resistance and cracking resistance.

Figure 2:
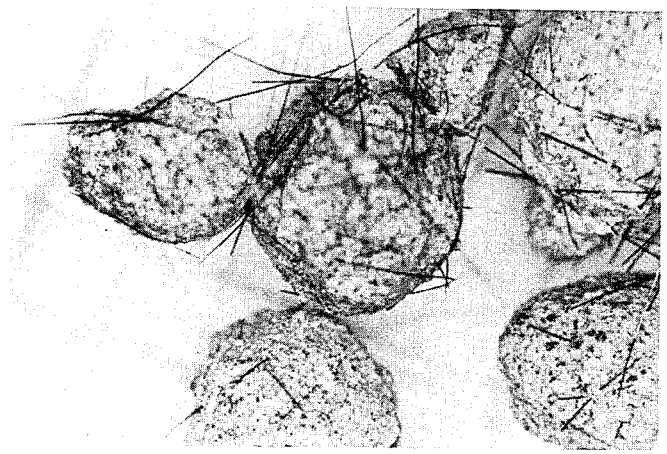
FIGS. 2 and 3 are photos each showing in a magnified fashion a grain for construction material of the present invention.
Figure 3:
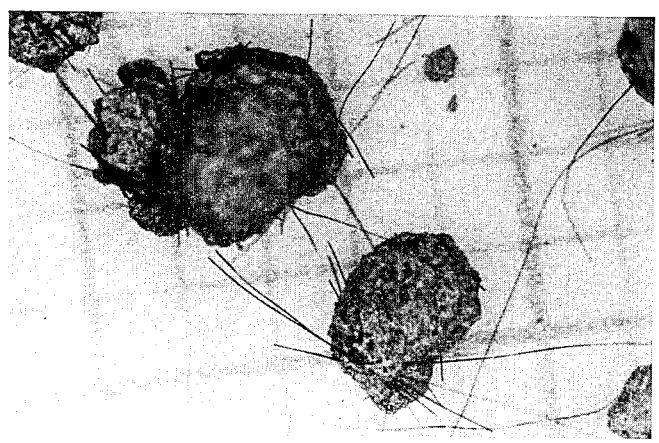

FIGS. 2 and 3 are photos showing in a magnified fashion the grain for construction material of the present invention, which was prepared by granulating a mixture consisting of 80 parts by weight of fly ash (main material), 20 parts by weight of cement (binder), 10 parts by weight of shale powder (thickening agent), and a reinforcing fiber "Kureha C-106T" (which is a trademark of a pitch-type carbon fiber having a diameter of 18 microns, a length of 6 mm and a specific gravity of 1.65), using an Irish reverse flow type high speed mixer, followed by subjecting the resultant grains to a steam curing for 6 hours.

The grain for construction material of the present invention is sized 2.5 mm or less in diameter, which fully meets the fine aggregate specified in Standards of Reinforced Concrete by Civil Engineering Institute of Japan. Also, the grain for construction material has an absolute dry specific gravity of 1.20.

Figure 4:
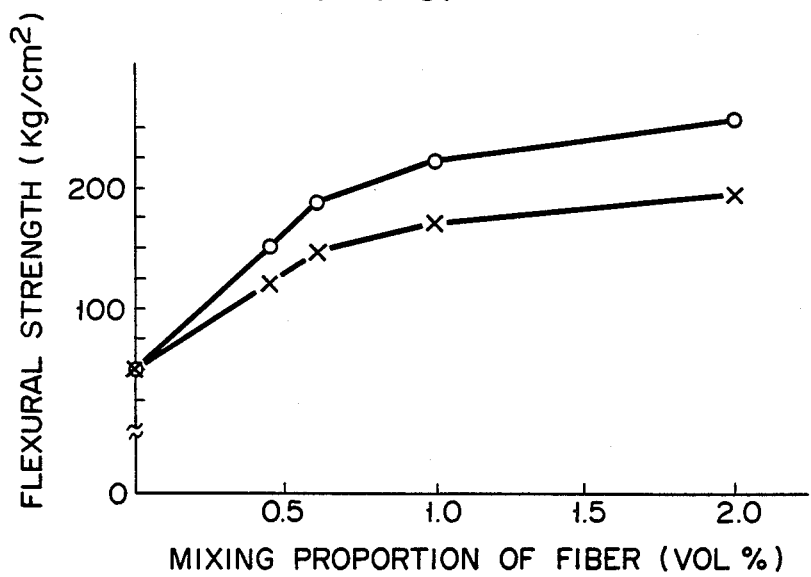
FIGS. 4 and 5 are graphs each showing the effect produced by the grain for construction material of the present invention.
Figure 5:
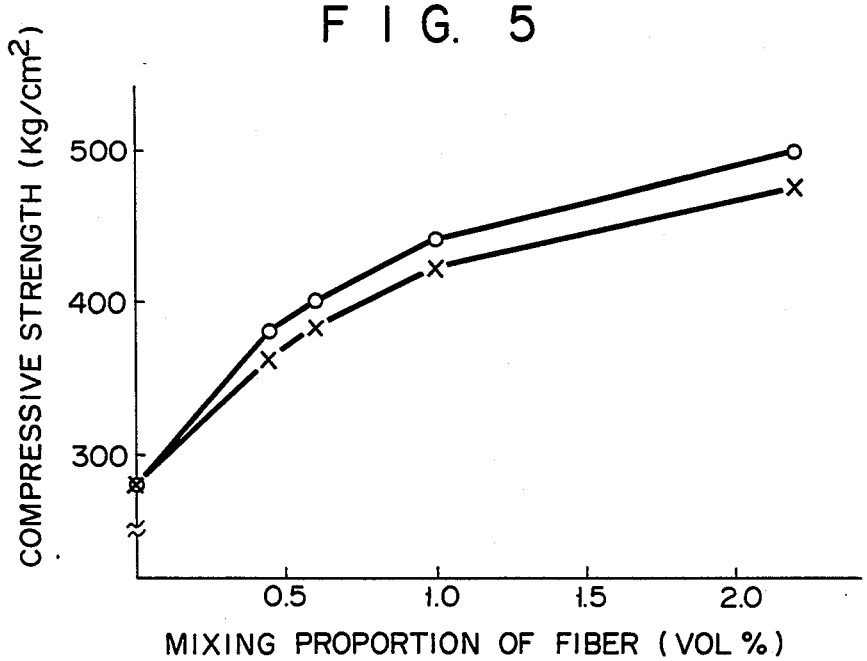

The construction material prepared by using the grain of the present invention has a mechanical strength higher than that of the conventional construction material in which the reinforcing fibers are mixed with the binder. FIG. 4 shows the flexural strength of the construction material with respect to the mixing proportion (% by volume) of the reinforcing fibers in the construction material. The marks "o" in FIG. 4 denote the construction material prepared by using the grain of the present invention in which the reinforcing fibers project outward from the surface of the grain body, with the marks "x" denoting the conventional construction material in which the reinforcing fibers are mixed with the binder. Further, FIG. 5 shows the compressive strength of the construction material with respect to the mixing proportion (% by volume) of the reinforcing fibers in the construction material. The marks "o" and "x" shown in FIG. 5 are equal to those shown in FIG. 4. In these experiments, the mixing ratio of cement to the grains, i.e., aggregates, was 1:2, and the water-to-cement ratio was 32%. Also, 3% of "Mighty 50", a trademark of a high performance water reducing agent, was used as an additive.

As apparent from FIGS. 4 and 5, the construction material prepared by using the grain of the present invention is superior to the conventional construction material in both the flexural strength and compressive strength. Clearly, the improved mechanical strength in the present invention is derived from the mechanism that the reinforcing fibers projecting outward from the surface of the grain body permit increasing the bonding strength between the grain, i.e., aggregate, and the binder in the present invention. What should also be noted is that the grain for construction material of the present invention can be readily used in the construction site because the reinforcing fibers are mixed in advance with the grain. In the prior art, however, the reinforcing fibers must be uniformly dispersed in the binder in the construction site, which is considerably troublesome.

What is claimed is:

1. A grain for construction material, comprising a grain body with a diameter of 2.5 mm or less and reinforcing fibers projecting outward from the surface of the grain body.

2. The grain for construction material according to claim 1, wherein the reinforcing fiber has a diameter of 5 to 50 microns and a length which should be at least equal to the diameter of the grain body but should not be greater than 10 times the diameter of the grain body.

3. The grain for construction material according to claim 2, wherein the reinforcing fiber is formed of a material selected from the group consisting of nylon, aramid, carbon, glass, ceramics, metal and asbestos.

4. The grain for construction material according to any one of preceding claims, wherein the grain body is formed by adding a binder to a main material selected from the group consisting of fly ash and slug powder.

* * * * *